US008194882B2

(12) United States Patent
Every et al.

(10) Patent No.: US 8,194,882 B2
(45) Date of Patent: Jun. 5, 2012

(54) SYSTEM AND METHOD FOR PROVIDING SINGLE MICROPHONE NOISE SUPPRESSION FALLBACK

(75) Inventors: Mark Every, Palo Alto, CA (US); Carlos Avendano, Campbell, CA (US); Ludger Solbach, Mountain View, CA (US); Carlo Murgia, Aliso Viejo, CA (US)

(73) Assignee: Audience, Inc., Mountain View, CA (US)

( * ) Notice: Subject to any disclaimer, the term of this patent is extended or adjusted under 35 U.S.C. 154(b) by 980 days.

(21) Appl. No.: 12/072,931

(22) Filed: Feb. 29, 2008

(65) Prior Publication Data

US 2009/0220107 A1 Sep. 3, 2009

(51) Int. Cl.
*H04B 15/00* (2006.01)

(52) U.S. Cl. ..................................... 381/94.1; 381/71.1

(58) Field of Classification Search ............. 381/92–94, 381/94.1, 94.2, 71.1; 704/233
See application file for complete search history.

(56) References Cited

U.S. PATENT DOCUMENTS 3,976,863 A 8/1976 Engel
3,978,287 A 8/1976 Fletcher et al.
4,137,510 A 1/1979 Iwahara
4,433,604 A 2/1984 Ott
4,516,259 A 5/1985 Yato et al.
4,535,473 A 8/1985 Sakata
4,536,844 A 8/1985 Lyon
4,581,758 A 4/1986 Coker et al.
4,628,529 A 12/1986 Borth et al.
4,630,304 A 12/1986 Borth et al.
4,649,505 A 3/1987 Zinser, Jr. et al.
4,658,426 A 4/1987 Chabries et al.
4,674,125 A 6/1987 Carlson et al.
4,718,104 A 1/1988 Anderson
4,811,404 A 3/1989 Vilmur et al.
4,812,996 A 3/1989 Stubbs
4,864,620 A 9/1989 Bialick
4,920,508 A 4/1990 Yassaie et al.
5,027,410 A 6/1991 Williamson et al.
5,054,085 A 10/1991 Meisel et al.

(Continued)

FOREIGN PATENT DOCUMENTS

JP 62110349 5/1987

(Continued)

OTHER PUBLICATIONS

Allen, Jont B. "Short Term Spectral Analysis, Synthesis, and Modification by Discrete Fourier Transform", IEEE Transactions on Acoustics, Speech, and Signal Processing. vol. ASSP-25, No. 3, Jun. 1977. pp. 235-238.

(Continued)

*Primary Examiner* — Nathan Ha
(74) *Attorney, Agent, or Firm* — Carr & Ferrell LLP

(57) ABSTRACT

Systems and methods for providing single microphone noise suppression fallback are provided. In exemplary embodiments, primary and secondary acoustic signals are received. A single microphone noise estimate may be generated based on the primary acoustic signal, while a dual microphone noise estimate may be generated based on the primary and secondary acoustic signals. A combined noise estimate based on the single and dual microphone noise estimates is then determined. Using the combined noise estimate, a gain mask may be generated and applied to the primary acoustic signal to generate a noise suppressed signal. Subsequently, the noise suppressed signal may be output.

21 Claims, 7 Drawing Sheets

U.S. PATENT DOCUMENTS 5,058,419 A 10/1991 Nordstrom et al.
5,099,738 A 3/1992 Hotz
5,119,711 A 6/1992 Bell et al.
5,142,961 A 9/1992 Paroutaud
5,150,413 A 9/1992 Nakatani et al.
5,175,769 A 12/1992 Hejna, Jr. et al.
5,187,776 A 2/1993 Yanker
5,208,864 A 5/1993 Kaneda
5,210,366 A 5/1993 Sykes, Jr.
5,224,170 A 6/1993 Waite, Jr.
5,230,022 A 7/1993 Sakata
5,319,736 A 6/1994 Hunt
5,323,459 A 6/1994 Hirano
5,341,432 A 8/1994 Suzuki et al.
5,381,473 A 1/1995 Andrea et al.
5,381,512 A 1/1995 Holton et al.
5,400,409 A 3/1995 Linhard
5,402,493 A 3/1995 Goldstein
5,402,496 A 3/1995 Soli et al.
5,471,195 A 11/1995 Rickman
5,473,702 A 12/1995 Yoshida et al.
5,473,759 A 12/1995 Slaney et al.
5,479,564 A 12/1995 Vogten et al.
5,502,663 A 3/1996 Lyon
5,544,250 A 8/1996 Urbanski
5,574,824 A 11/1996 Slyh et al.
5,583,784 A 12/1996 Kapust et al.
5,587,998 A 12/1996 Velardo, Jr. et al.
5,590,241 A 12/1996 Park et al.
5,602,962 A 2/1997 Kellermann
5,675,778 A 10/1997 Jones
5,682,463 A 10/1997 Allen et al.
5,694,474 A 12/1997 Ngo et al.
5,706,395 A 1/1998 Arslan et al.
5,717,829 A 2/1998 Takagi
5,729,612 A 3/1998 Abel et al.
5,732,189 A 3/1998 Johnston et al.
5,749,064 A 5/1998 Pawate et al.
5,757,937 A 5/1998 Itoh et al.
5,792,971 A 8/1998 Timis et al.
5,796,819 A 8/1998 Romesburg
5,806,025 A 9/1998 Vis et al.
5,809,463 A 9/1998 Gupta et al.
5,825,320 A 10/1998 Miyamori et al.
5,839,101 A 11/1998 Vahatalo et al.
5,920,840 A 7/1999 Satyamurti et al.
5,933,495 A 8/1999 Oh
5,943,429 A 8/1999 Handel
5,956,674 A 9/1999 Smyth et al.
5,974,380 A 10/1999 Smyth et al.
5,978,824 A 11/1999 Ikeda
5,983,139 A 11/1999 Zierhofer
5,990,405 A 11/1999 Auten et al.
6,002,776 A 12/1999 Bhadkamkar et al.
6,061,456 A 5/2000 Andrea et al.
6,072,881 A 6/2000 Linder
6,097,820 A 8/2000 Turner
6,108,626 A 8/2000 Cellario et al.
6,122,610 A 9/2000 Isabelle
6,134,524 A 10/2000 Peters et al.
6,137,349 A 10/2000 Menkhoff et al.
6,140,809 A 10/2000 Doi
6,173,255 B1 1/2001 Wilson et al.
6,180,273 B1 1/2001 Okamoto
6,216,103 B1 4/2001 Wu et al.
6,222,927 B1 4/2001 Feng et al.
6,223,090 B1 4/2001 Brungart
6,226,616 B1 5/2001 You et al.
6,263,307 B1 7/2001 Arslan et al.
6,266,633 B1 7/2001 Higgins et al.
6,317,501 B1 11/2001 Matsuo
6,339,758 B1 1/2002 Kanazawa et al.
6,355,869 B1 3/2002 Mitton
6,363,345 B1 3/2002 Marash et al.
6,381,570 B2 4/2002 Li et al.
6,430,295 B1 8/2002 Handel et al.
6,434,417 B1 8/2002 Lovett
6,449,586 B1 9/2002 Hoshuyama
6,469,732 B1 10/2002 Chang et al.
6,487,257 B1 11/2002 Gustafsson et al.
6,496,795 B1 12/2002 Malvar
6,513,004 B1 1/2003 Rigazio et al.
6,516,066 B2 2/2003 Hayashi
6,529,606 B1 3/2003 Jackson, Jr. II et al.
6,549,630 B1 4/2003 Bobisuthi
6,584,203 B2 6/2003 Elko et al.
6,622,030 B1 9/2003 Romesburg et al.
6,717,991 B1 4/2004 Gustafsson et al.
6,718,309 B1 4/2004 Selly
6,738,482 B1 5/2004 Jaber
6,760,450 B2 7/2004 Matsuo
6,785,381 B2 8/2004 Gartner et al.
6,792,118 B2 9/2004 Watts
6,795,558 B2 9/2004 Matsuo
6,798,886 B1 9/2004 Smith et al.
6,810,273 B1 10/2004 Mattila et al.
6,882,736 B2 4/2005 Dickel et al.
6,915,264 B2 7/2005 Baumgarte
6,917,688 B2 7/2005 Yu et al.
6,944,510 B1 9/2005 Ballesty et al.
6,978,159 B2 12/2005 Feng et al.
6,982,377 B2 1/2006 Sakurai et al.
6,999,582 B1 2/2006 Popovic et al.
7,016,507 B1 3/2006 Brennan
7,020,605 B2 3/2006 Gao
7,031,478 B2 4/2006 Belt et al.
7,054,452 B2 5/2006 Ukita
7,065,485 B1 6/2006 Chong-White et al.
7,076,315 B1 7/2006 Watts
7,092,529 B2 8/2006 Yu et al.
7,092,882 B2 8/2006 Arrowood et al.
7,099,821 B2 8/2006 Visser et al.
7,142,677 B2 11/2006 Gonopolskiy et al.
7,146,316 B2 12/2006 Alves
7,155,019 B2 12/2006 Hou
7,164,620 B2 1/2007 Hoshuyama
7,171,008 B2 1/2007 Elko
7,171,246 B2 1/2007 Mattila et al.
7,174,022 B1 2/2007 Zhang et al.
7,206,418 B2 4/2007 Yang et al.
7,209,567 B1 4/2007 Kozel et al.
7,225,001 B1 5/2007 Eriksson et al.
7,242,762 B2 7/2007 He et al.
7,246,058 B2 7/2007 Burnett
7,254,242 B2 8/2007 Ise et al.
7,359,520 B2 4/2008 Brennan et al.
7,412,379 B2 8/2008 Taori et al.
7,433,907 B2 10/2008 Nagai et al.
7,555,434 B2 6/2009 Nomura et al.
7,949,522 B2 5/2011 Hetherington et al.
2001/0016020 A1 8/2001 Gustafsson et al.
2001/0031053 A1 10/2001 Feng et al.
2002/0002455 A1 1/2002 Accardi et al.
2002/0009203 A1 1/2002 Erten
2002/0041693 A1 4/2002 Matsuo
2002/0080980 A1 6/2002 Matsuo
2002/0106092 A1 8/2002 Matsuo
2002/0116187 A1 8/2002 Erten
2002/0133334 A1 9/2002 Coorman et al.
2002/0147595 A1 10/2002 Baumgarte
2002/0184013 A1 12/2002 Walker
2003/0014248 A1 1/2003 Vetter
2003/0026437 A1 2/2003 Janse et al.
2003/0033140 A1 2/2003 Taori et al.
2003/0039369 A1 2/2003 Bullen
2003/0040908 A1 2/2003 Yang et al.
2003/0061032 A1 3/2003 Gonopolskiy
2003/0063759 A1 4/2003 Brennan et al.
2003/0072382 A1 4/2003 Raleigh et al.
2003/0072460 A1 4/2003 Gonopolskiy et al.
2003/0095667 A1 5/2003 Watts
2003/0099345 A1 5/2003 Gartner et al.
2003/0101048 A1 5/2003 Liu
2003/0103632 A1 6/2003 Goubran et al.
2003/0128851 A1 7/2003 Furuta
2003/0138116 A1 7/2003 Jones et al.
2003/0147538 A1 8/2003 Elko

| | | | |
|---|---|---|---|
| 2003/0169891 A1 | 9/2003 | Ryan et al. | |
| 2003/0228023 A1 | 12/2003 | Burnett et al. | |
| 2004/0013276 A1 | 1/2004 | Ellis et al. | |
| 2004/0047464 A1 | 3/2004 | Yu et al. | |
| 2004/0057574 A1 | 3/2004 | Faller | |
| 2004/0078199 A1 | 4/2004 | Kremer et al. | |
| 2004/0131178 A1 | 7/2004 | Shahaf et al. | |
| 2004/0133421 A1 | 7/2004 | Burnett et al. | |
| 2004/0165736 A1 | 8/2004 | Hetherington et al. | |
| 2004/0196989 A1 | 10/2004 | Friedman et al. | |
| 2004/0263636 A1 | 12/2004 | Cutler et al. | |
| 2005/0025263 A1 | 2/2005 | Wu | |
| 2005/0027520 A1 | 2/2005 | Mattila et al. | |
| 2005/0049864 A1 | 3/2005 | Kaltenmeier et al. | |
| 2005/0060142 A1 | 3/2005 | Visser et al. | |
| 2005/0152559 A1 | 7/2005 | Gierl et al. | |
| 2005/0185813 A1 | 8/2005 | Sinclair et al. | |
| 2005/0213778 A1 | 9/2005 | Buck et al. | |
| 2005/0216259 A1 | 9/2005 | Watts | |
| 2005/0228518 A1 | 10/2005 | Watts | |
| 2005/0276423 A1 | 12/2005 | Aubauer et al. | |
| 2005/0288923 A1 | 12/2005 | Kok | |
| 2006/0072768 A1 | 4/2006 | Schwartz et al. | |
| 2006/0074646 A1 | 4/2006 | Alves et al. | |
| 2006/0098809 A1 | 5/2006 | Nongpiur et al. | |
| 2006/0120537 A1 | 6/2006 | Burnett et al. | |
| 2006/0133621 A1 | 6/2006 | Chen et al. | |
| 2006/0149535 A1 | 7/2006 | Choi et al. | |
| 2006/0184363 A1 | 8/2006 | McCree et al. | |
| 2006/0198542 A1 | 9/2006 | Benjelloun Touimi et al. | |
| 2006/0222184 A1 | 10/2006 | Buck et al. | |
| 2007/0021958 A1 | 1/2007 | Visser et al. | |
| 2007/0027685 A1 | 2/2007 | Arakawa et al. | |
| 2007/0033020 A1 | 2/2007 | (Kelleher) Francois et al. | |
| 2007/0067166 A1 | 3/2007 | Pan et al. | |
| 2007/0078649 A1 | 4/2007 | Hetherington et al. | |
| 2007/0094031 A1 | 4/2007 | Chen | |
| 2007/0100612 A1 | 5/2007 | Ekstrand et al. | |
| 2007/0116300 A1 | 5/2007 | Chen | |
| 2007/0150268 A1 | 6/2007 | Acero et al. | |
| 2007/0154031 A1* | 7/2007 | Avendano et al. | 381/92 |
| 2007/0165879 A1 | 7/2007 | Deng et al. | |
| 2007/0195968 A1 | 8/2007 | Jaber | |
| 2007/0230712 A1 | 10/2007 | Belt et al. | |
| 2007/0276656 A1 | 11/2007 | Solbach et al. | |
| 2008/0019548 A1* | 1/2008 | Avendano | 381/313 |
| 2008/0033723 A1 | 2/2008 | Jang et al. | |
| 2008/0140391 A1 | 6/2008 | Yen et al. | |
| 2008/0201138 A1 | 8/2008 | Visser et al. | |
| 2008/0228478 A1 | 9/2008 | Hetherington et al. | |
| 2008/0260175 A1 | 10/2008 | Elko | |
| 2009/0012783 A1* | 1/2009 | Klein | 704/226 |
| 2009/0012786 A1 | 1/2009 | Zhang et al. | |
| 2009/0129610 A1 | 5/2009 | Kim et al. | |
| 2009/0238373 A1 | 9/2009 | Klein | |
| 2009/0253418 A1* | 10/2009 | Makinen | 455/416 |
| 2009/0271187 A1 | 10/2009 | Yen et al. | |
| 2009/0323982 A1 | 12/2009 | Solbach et al. | |
| 2010/0094643 A1 | 4/2010 | Avendano et al. | |
| 2010/0278352 A1* | 11/2010 | Petit et al. | 381/71.1 |
| 2011/0178800 A1* | 7/2011 | Watts | 704/233 |

FOREIGN PATENT DOCUMENTS

| | | |
|---|---|---|
| JP | 4184400 | 7/1992 |
| JP | 5053587 | 3/1993 |
| JP | 05-172865 | 7/1993 |
| JP | 6269083 | 9/1994 |
| JP | 10-313497 | 11/1998 |
| JP | 11-249693 | 9/1999 |
| JP | 2004053895 | 2/2004 |
| JP | 2004531767 | 10/2004 |
| JP | 2004533155 | 10/2004 |
| JP | 2005110127 | 4/2005 |
| JP | 2005148274 | 6/2005 |
| JP | 2005518118 | 6/2005 |
| JP | 2005195955 | 7/2005 |
| WO | 01/74118 | 10/2001 |
| WO | 02080362 | 10/2002 |
| WO | 02103676 | 12/2002 |
| WO | 03/043374 | 5/2003 |
| WO | 03/069499 | 8/2003 |
| WO | 03069499 | 8/2003 |
| WO | 2004/010415 | 1/2004 |
| WO | 2007/081916 | 7/2007 |
| WO | 2007/140003 | 12/2007 |
| WO | 2010/005493 | 1/2010 |

OTHER PUBLICATIONS

Allen, Jont B. et al. "A Unified Approach to Short-Time Fourier Analysis and Synthesis", Proceedings of the IEEE. vol. 65, No. 11, Nov. 1977. pp. 1558-1564.

Avendano, Carlos, "Frequency-Domain Source Identification and Manipulation in Stereo Mixes for Enhancement, Suppression and Re-Panning Applications," 2003 IEEE Workshop on Application of Signal Processing to Audio and Acoustics, Oct. 19-22, pp. 55-58, New Paltz, New York, USA.

Boll, Steven F. "Suppression of Acoustic Noise in Speech using Spectral Subtraction", IEEE Transactions on Acoustics, Speech and Signal Processing, vol. ASSP-27, No. 2, Apr. 1979, pp. 113-120.

Boll, Steven F. et al. "Suppression of Acoustic Noise in Speech Using Two Microphone Adaptive Noise Cancellation", IEEE Transactions on Acoustic, Speech, and Signal Processing, vol. ASSP-28, No. 6, Dec. 1980, pp. 752-753.

Boll, Steven F. "Suppression of Acoustic Noise in Speech Using Spectral Subtraction", Dept. of Computer Science, University of Utah Salt Lake City, Utah, Apr. 1979, pp. 18-19.

Chen, Jingdong et al. "New Insights into the Noise Reduction Wiener Filter", IEEE Transactions on Audio, Speech, and Language Processing. vol. 14, No. 4, Jul. 2006, pp. 1218-1234.

Cohen, Israel et al. "Microphone Array Post-Filtering for Non-Stationary Noise Suppression", IEEE International Conference on Acoustics, Speech, and Signal Processing, May 2002, pp. 1-4.

Cohen, Israel, "Multichannel Post-Filtering in Nonstationary Noise Environments", IEEE Transactions on Signal Processing, vol. 52, No. 5, May 2004, pp. 1149-1160.

Dahl, Mattias et al., "Simultaneous Echo Cancellation and Car Noise Suppression Employing a Microphone Array", 1997 IEEE International Conference on Acoustics, Speech, and Signal Processing, Apr. 21-24, pp. 239-242.

Elko, Gary W., "Chapter 2: Differential Microphone Arrays", "Audio Signal Processing for Next-Generation Multimedia Communication Systems", 2004, pp. 12-65, Kluwer Academic Publishers, Norwell, Massachusetts, USA.

"ENT 172." Instructional Module. Prince George's Community College Department of Engineering Technology. Accessed: Oct. 15, 2011. Subsection: "Polar and Rectangular Notation". <http://academic.ppgcc.edu/ent/ent172_instr_mod.html>.

Fuchs, Martin et al. "Noise Suppression for Automotive Applications Based on Directional Information", 2004 IEEE International Conference on Acoustics, Speech, and Signal Processing, May 17-21, pp. 237-240.

Fulghum, D. P. et al., "LPC Voice Digitizer with Background Noise Suppression", 1979 IEEE International Conference on Acoustics, Speech, and Signal Processing, pp. 220-223.

Goubran, R.A. "Acoustic Noise Suppression Using Regression Adaptive Filtering", 1990 IEEE 40th Vehicular Technology Conference, May 6-9, pp. 48-53.

Graupe, Daniel et al., "Blind Adaptive Filtering of Speech from Noise of Unknown Spectrum Using a Virtual Feedback Configuration", IEEE Transactions on Speech and Audio Processing, Mar. 2000, vol. 8, No. 2, pp. 146-158.

Haykin, Simon et al. "Appendix A.2 Complex Numbers." Signals and Systems. 2nd Ed. 2003. p. 764.

Hermansky, Hynek "Should Recognizers Have Ears?", in Proc. ESCA Tutorial and Research Workshop on Robust Speech Recognition for Unknown Communication Channels, pp. 1-10, France 1997.

Hohmann, V. "Frequency Analysis and Synthesis Using a Gammatone Filterbank", ACTA Acustica United with Acustica, 2002, vol. 88, pp. 433-442.

Jeffress, Lloyd A. et al. "A Place Theory of Sound Localization," Journal of Comparative and Physiological Psychology, 1948, vol. 41, p. 35-39.

Jeong, Hyuk et al., "Implementation of a New Algorithm Using the STFT with Variable Frequency Resolution for the Time-Frequency Auditory Model", J. Audio Eng. Soc., Apr. 1999, vol. 47, No. 4., pp. 240-251.
Kates, James M. "A Time-Domain Digital Cochlear Model", IEEE Transactions on Signal Processing, Dec. 1991, vol. 39, No. 12, pp. 2573-2592.
Lazzaro, John et al., "A Silicon Model of Auditory Localization," Neural Computation Spring 1989, vol. 1, pp. 47-57, Massachusetts Institute of Technology.
Lippmann, Richard P. "Speech Recognition by Machines and Humans", Speech Communication, Jul. 1997, vol. 22, No. 1, pp. 1-15.
Liu, Chen et al. "A Two-Microphone Dual Delay-Line Approach for Extraction of a Speech Sound in the Presence of Multiple Interferers", Journal of the Acoustical Society of America, vol. 110, No. 6, Dec. 2001, pp. 3218-3231.
Martin, Rainer et al. "Combined Acoustic Echo Cancellation, Dereverberation and Noise Reduction: A two Microphone Approach", Annales des Telecommunications/Annals of Telecommunications. vol. 49, No. 7-8, Jul.-Aug. 1994, pp. 429-438.
Martin, Rainer "Spectral Subtraction Based on Minimum Statistics", in Proceedings Europe. Signal Processing Conf., 1994, pp. 1182-1185.
Mitra, Sanjit K. Digital Signal Processing: a Computer-based Approach. 2nd Ed. 2001. pp. 131-133.
Mizumachi, Mitsunori et al. "Noise Reduction by Paired-Microphones Using Spectral Subtraction", 1998 IEEE International Conference on Acoustics, Speech and Signal Processing, May 12-15. pp. 1001-1004.
Moonen, Marc et al. "Multi-Microphone Signal Enhancement Techniques for Noise Suppression and Dereverbration," http://www.esat.kuleuven.ac.be/sista/yearreport97//node37.html, accessed on Apr. 21, 1998.
Watts, Lloyd Narrative of Prior Disclosure of Audio Display on Feb. 15, 2000 and May 31, 2000.
Cosi, Piero et al. (1996), "Lyon's Auditory Model Inversion: a Tool for Sound Separation and Speech Enhancement," Proceedings of ESCA Workshop on 'The Auditory Basis of Speech Perception,' Keele University, Keele (UK), Jul. 15-19, 1996, pp. 194-197.
Parra, Lucas et al. "Convolutive Blind Separation of Non-Stationary Sources", IEEE Transactions on Speech and Audio Processing. vol. 8, No. 3, May 2008, pp. 320-327.
Rabiner, Lawrence R. et al. "Digital Processing of Speech Signals", (Prentice-Hall Series in Signal Processing). Upper Saddle River, NJ: Prentice Hall, 1978.
Weiss, Ron et al., "Estimating Single-Channel Source Separation Masks: Revelance Vector Machine Classifiers vs. Pitch-Based Masking", Workshop on Statistical and Perceptual Audio Processing, 2006.
Schimmel, Steven et al., "Coherent Envelope Detection for Modulation Filtering of Speech," 2005 IEEE International Conference on Acoustics, Speech, and Signal Processing, vol. 1, No. 7, pp. 221-224.
Slaney, Malcom, "Lyon's Cochlear Model", Advanced Technology Group, Apple Technical Report #13, Apple Computer, Inc., 1988, pp. 1-79.
Slaney, Malcom, et al. "Auditory Model Inversion for Sound Separation," 1994 IEEE International Conference on Acoustics, Speech and Signal Processing, Apr. 19-22, vol. 2, pp. 77-80.
Slaney, Malcom. "An Introduction to Auditory Model Inversion", Interval Technical Report IRC 1994-014, http://coweb.ecn.purdue.edu/~maclom/interval/1994-014/, Sep. 1994, accessed on Jul. 6, 2010.
Solbach, Ludger "An Architecture for Robust Partial Tracking and Onset Localization in Single Channel Audio Signal Mixes", Technical University Hamburg-Harburg, 1998.
Stahl, V. et al., "Quantile Based Noise Estimation for Spectral Subtraction and Wiener Filtering," 2000 IEEE International Conference on Acoustics, Speech, and Signal Processing, Jun. 5-9, vol. 3, pp. 1875-1878.
Syntrillium Software Corporation, "Cool Edit User's Manual", 1996, pp. 1-74.
Tashev, Ivan et al. "Microphone Array for Headset with Spatial Noise Suppressor", http://research.microsoft.com/users/ivantash/Documents/Tashev_MAforHeadset_HSCMA_05.pdf. (4 pages).
Tchorz, Jurgen et al., "SNR Estimation Based on Amplitude Modulation Analysis with Applications to Noise Suppression", IEEE Transactions on Speech and Audio Processing, vol. 11, No. 3, May 2003, pp. 184-192.
Valin, Jean-Marc et al. "Enhanced Robot Audition Based on Microphone Array Source Separation with Post-Filter", Proceedings of 2004 IEEE/RSJ International Conference on Intelligent Robots and Systems, Sep. 28-Oct. 2, 2004, Sendai, Japan. pp. 2123-2128.
Watts, Lloyd, "Robust Hearing Systems for Intelligent Machines," Applied Neurosystems Corporation, 2001, pp. 1-5.
Widrow, B. et al., "Adaptive Antenna Systems," Proceedings of the IEEE, vol. 55, No. 12, pp. 2143-2159, Dec. 1967.
Yoo, Heejong et al., "Continuous-Time Audio Noise Suppression and Real-Time Implementation", 2002 IEEE International Conference on Acoustics, Speech, and Signal Processing, May 13-17, pp. IV3980-IV3983.
International Search Report dated Jun. 8, 2001 in Application No. PCT/US01/08372.
International Search Report dated Apr. 3, 2003 in Application No. PCT/US02/36946.
International Search Report dated May 29, 2003 in Application No. PCT/US03/04124.
International Search Report and Written Opinion dated Oct. 19, 2007 in Application No. PCT/US07/00463.
International Search Report and Written Opinion dated Apr. 9, 2008 in Application No. PCT/US07/21654.
International Search Report and Written Opinion dated Sep. 16, 2008 in Application No. PCT/US07/12628.
International Search Report and Written Opinion dated Oct. 1, 2008 in Application No. PCT/US08/08249.
International Search Report and Written Opinion dated May 11, 2009 in Application No. PCT/US09/01667.
International Search Report and Written Opinion dated Aug. 27, 2009 in Application No. PCT/US09/03813.
International Search Report and Written Opinion dated May 20, 2010 in Application No. PCT/US09/06754.
Fast Cochlea Transform, US Trademark Reg. No. 2,875,755 (Aug. 17, 2004).
Dahl, Mattias et al., "Acoustic Echo and Noise Cancelling Using Microphone Arrays", International Symposium on Signal Processing and its Applications, ISSPA, Gold coast, Australia, Aug. 25-30, 1996, pp. 379-382.
Demol, M. et al. "Efficient Non-Uniform Time-Scaling of Speech With WSOLA for CALL Applications", Proceedings of InSTIL/ICALL2004—NLP and Speech Technologies in Advanced Language Learning Systems—Venice Jun. 17-19, 2004.
Laroche, Jean. "Time and Pitch Scale Modification of Audio Signals", in "Applications of Digital Signal Processing to Audio and Acoustics", The Kluwer International Series in Engineering and Computer Science, vol. 437, pp. 279-309, 2002.
Moulines, Eric et al., "Non-Parametric Techniques for Pitch-Scale and Time-Scale Modification of Speech", Speech Communication, vol. 16, pp. 175-205, 1995.
Verhelst, Werner, "Overlap-Add Methods for Time-Scaling of Speech", Speech Communication vol. 30, pp. 207-221, 2000.
Advisory Action mailed Feb. 14, 2012, In U.S. Appl. No. 11/699,732, filed Jan. 29, 2007.
Notice of Allowance mailed Jan. 27, 2012, In U.S. Appl. No. 12/004,897, filed Dec. 21, 2007.
Office Action mailed Feb. 15, 2012, in U.S. Appl. No. 12/228,034, filed Aug. 8, 2008.
Notice of Allowance mailed Feb. 23, 2012, in U.S. Appl. No. 12/004,788, filed Dec. 21, 2007.
Notice of Allowance mailed Mar. 1, 2012, in U.S. Appl. No. 12/080,115, filed Mar. 31, 2008.

* cited by examiner

SYSTEM AND METHOD FOR PROVIDING SINGLE MICROPHONE NOISE SUPPRESSION FALLBACK

CROSS-REFERENCE TO RELATED APPLICATION

The present application is related to U.S. patent application Ser. No. 11/825,563 filed Jul. 6, 2007 and entitled "System and Method for Adaptive Intelligent Noise Suppression," U.S. patent application Ser. No. 11/343,524, filed Jan. 30, 2006 and entitled "System and Method for Utilizing Inter-Microphone Level Differences for Speech Enhancement," and U.S. patent application Ser. No. 11/699,732 filed Jan. 29, 2007 and entitled "System And Method For Utilizing Omni-Directional Microphones For Speech Enhancement," all of which are herein incorporated by reference.

BACKGROUND OF THE INVENTION

1. Field of Invention

The present invention relates generally to audio processing and more particularly to single microphone noise suppression fallback.

2. Description of Related Art

Presently, there are numerous methods for reducing background noise in speech recordings made in adverse environments. One such method is to use two or more microphones on an audio device. These microphones may be localized and allow the device to determine a difference between the microphone signals. For example, due to a space difference between the microphones, the difference in times of arrival of sound from a speech source to the microphones may be utilized to localize the speech source. Once localized, signals generated by the microphones can be spatially filtered to suppress the noise originating from different directions.

Disadvantageously, circumstance may occur in a dual microphone noise suppression system whereby a dependence on a secondary microphone may be unnecessary or cause misclassifications. For example, the secondary microphone may be blocked or fail. In other examples, distractors (e.g., noise) from a same spatial location as speech may not be distinguishable by using a plurality of microphones. As such, it is advantageous to have a system which may allow a fallback to single microphone noise suppression.

SUMMARY OF THE INVENTION

Embodiments of the present invention overcome or substantially alleviate one or more prior problems associated with noise suppression in a dual microphone noise suppression system. In exemplary embodiments, primary and secondary acoustic signals are received by primary and secondary acoustic sensors. The acoustic signals are then separated into frequency sub-bands for analysis. Subsequently, an energy module computes energy/power estimates during an interval of time for each frequency sub-band (i.e., power estimates or power spectrum).

The power spectra are then used by a noise estimate module to determine noise estimates. In exemplary embodiments, a single microphone noise estimate module generates a single microphone noise estimate based on the primary power spectrum. In contrast, a dual microphone noise estimate module generates a dual microphone noise estimate based on the primary and secondary power spectra.

A combined noise estimate based on the single and dual microphone noise estimates is then determined. In exemplary embodiments, a noise estimate integrator determines the combined noise estimate based on a maximum value between stationary and non-stationary noise estimates. In some embodiments, the stationary noise estimate may be determined based on a weighted single microphone noise estimate, while the non-stationary noise estimate may be determined based on both a dual microphone noise estimate and the stationary noise estimate.

Using the combined noise estimate, a gain mask may be generated and applied to the primary acoustic signal to generate a noise suppressed signal. Subsequently, the noise suppressed signal may be output.

DESCRIPTION OF EXEMPLARY EMBODIMENTS

The present invention provides exemplary systems and methods for providing single microphone noise suppression fallback. In exemplary embodiments, a dual microphone noise suppression system may be provided. However, certain circumstances may create a need to fallback to a single microphone noise suppression system. For example, a secondary microphone may become blocked or may otherwise malfunction. In another example, the near-end speech and distractor(s) may be in close spatial proximity. As a result, one or more spatial cues derived from both the primary and secondary microphones, such as the Inter-Microphone Level Difference, may be invalid or of insufficient spatial resolution to distinguish between speech and distractor(s), and, therefore, a noise estimate or gain mask based predominantly on this spatial cue may not be useful in suppressing noise. Exemplary embodiments are configured to allow the noise suppression system to suppress stationary distractors, particularly when discrimination between speech and distractor(s) is poor based on spatial cues derived from both the primary and secondary microphones. Furthermore, embodiments of the present invention may suppress noise in quasi-stationary noise environments including, for example, car noise, street noise, or babble noise.

Embodiments of the present invention may be practiced on any audio device that is configured to receive sound such as, but not limited to, cellular phones, phone handsets, headsets, and conferencing systems. While some embodiments of the present invention will be described in reference to operation on a cellular phone, the present invention may be practiced on any audio device.

Figure 1:
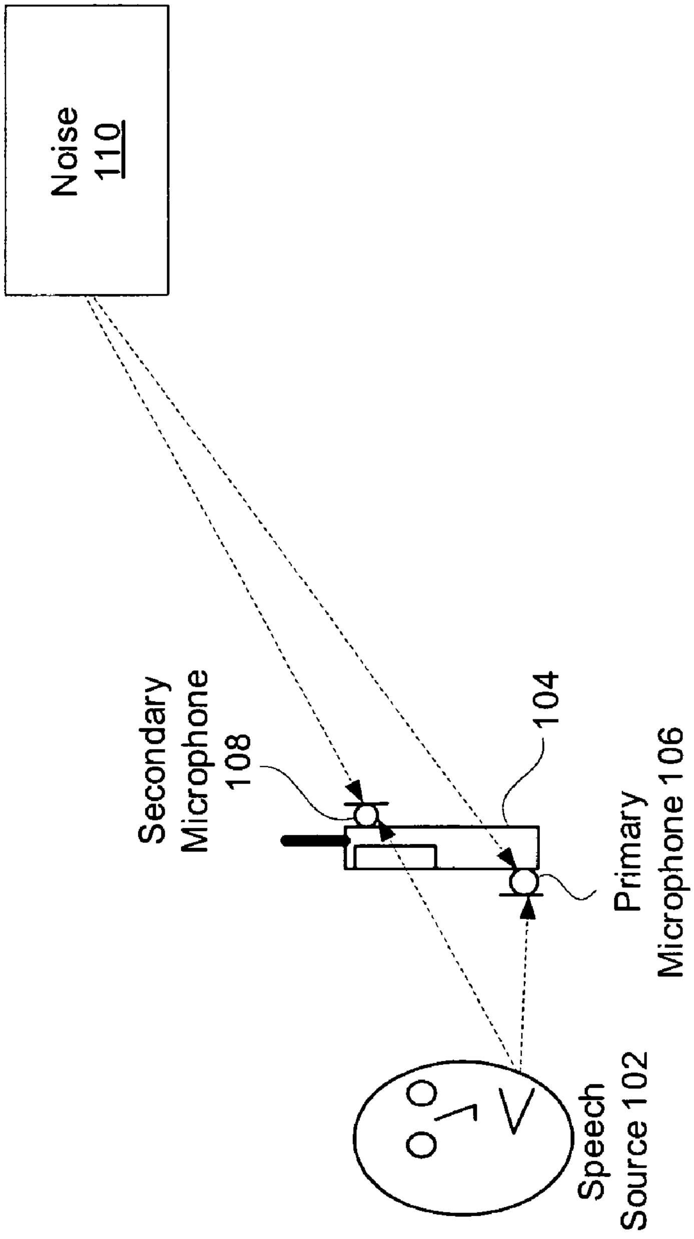
FIG. 1 is an environment in which embodiments of the present invention may be practiced.

Referring to FIG. 1, an environment in which embodiments of the present invention may be practiced is shown. A user provides an audio (speech) source 102 to an audio device 104. The exemplary audio device 104 may comprise two microphones: a primary microphone 106 relative to the audio source 102 and a secondary microphone 108 located a distance away from the primary microphone 106. In some embodiments, the microphones 106 and 108 comprise omnidirectional microphones.

While the microphones 106 and 108 (i.e., acoustic sensors) receive sound (i.e., acoustic signals) from the audio source 102, the microphones 106 and 108 also pick up noise 110. Although the noise 110 is shown coming from a single location in FIG. 1, the noise 110 may comprise any sounds from one or more locations different than the audio source 102, and may include reverberations and echoes. The noise 110 may be stationary, non-stationary, and/or a combination of both stationary and non-stationary noise.

Exemplary embodiments of the present invention may utilize level differences (e.g., energy differences) between the acoustic signals received by the two microphones 106 and 108 independent of how the level differences are obtained. Because the primary microphone 106 is typically much closer to the audio source 102 than the secondary microphone 108, the intensity level should be higher for the primary microphone 106 resulting in a larger energy level during a speech/voice segment, for example. The level difference may then be used to discriminate speech and noise in the time-frequency domain as will be discussed further below.

Figure 2:
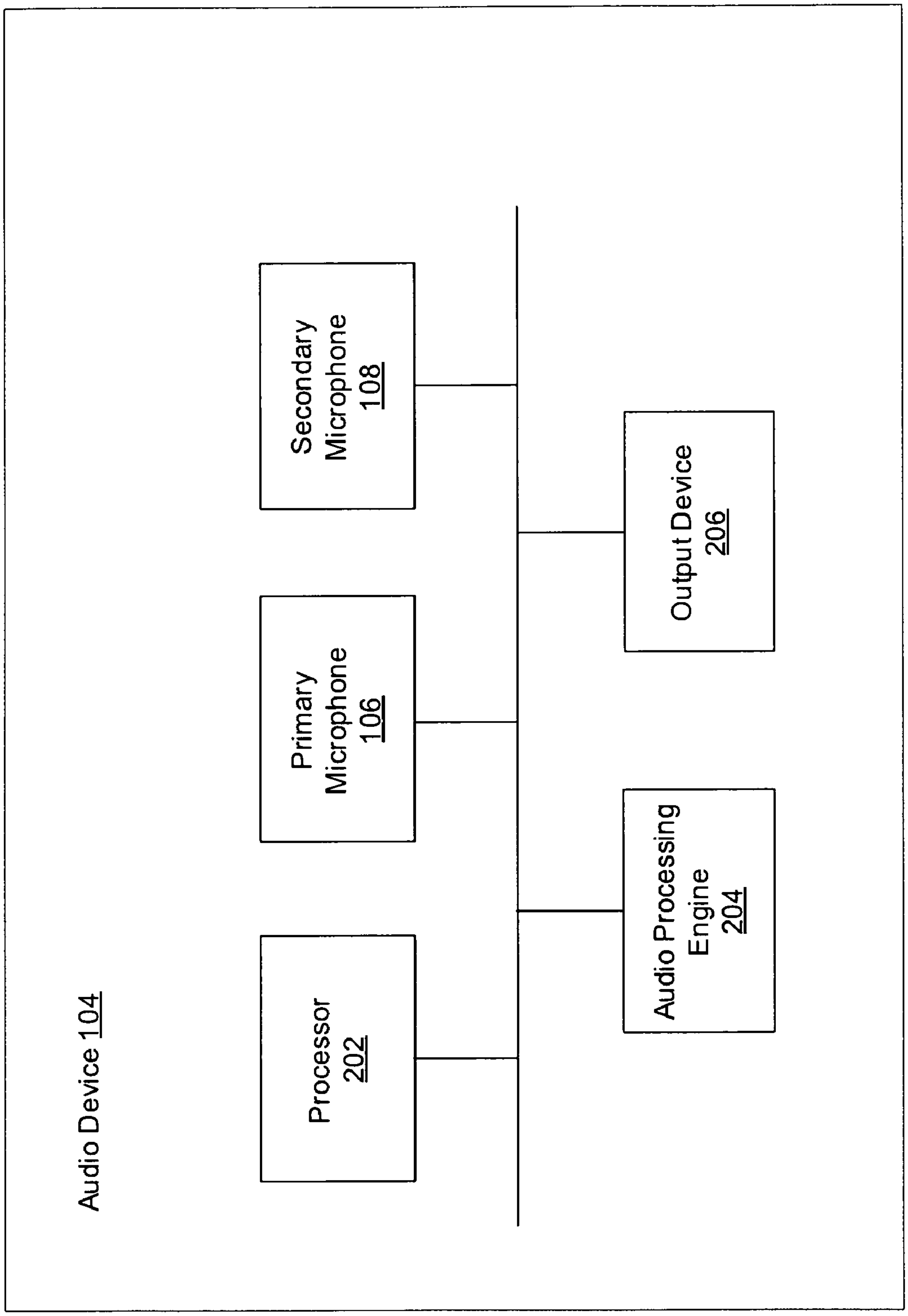
FIG. 2 is a block diagram of an exemplary audio device implementing embodiments of the present invention.

Referring now to FIG. 2, the exemplary audio device 104 is shown in more detail. In exemplary embodiments, the audio device 104 is an audio communication device that comprises a processor 202, the primary microphone 106, the secondary microphone 108, an audio processing engine 204, and an output device 206. The audio device 104 may comprise further components necessary for audio device 104 operations but not necessarily utilized with respect to embodiments of the present invention. The audio processing engine 204 will be discussed in more details in connection with FIG. 3.

As previously discussed, the primary and secondary microphones 106 and 108, respectively, may be spaced a distance apart in order to allow for an energy level difference between them. Upon reception by the microphones 106 and 108, the acoustic signals are converted into electric signals (i.e., a primary electric signal and a secondary electric signal). The electric signals may themselves be converted by an analog-to-digital converter (not shown) into digital signals for processing in accordance with some embodiments. In order to differentiate the acoustic signals, the acoustic signal received by the primary microphone 106 is herein referred to as the primary acoustic signal, while the acoustic signal received by the secondary microphone 108 is herein referred to as the secondary acoustic signal.

The output device 206 is any device which provides an audio output to the user. For example, the output device 206 may comprise an earpiece of a headset or handset, or a speaker on a conferencing device.

In various embodiments, where the primary and secondary microphones are omni-directional microphones that are closely-spaced (e.g., 1-2 cm apart), a beamforming technique may be used to simulate a forwards-facing and a backwards-facing directional microphone response. A level difference may be obtained using the simulated forwards-facing and the backwards-facing directional microphone. Similar to the discussion regarding FIG. 1, the level difference may be used to discriminate speech and noise in the time-frequency domain.

Figure 3:
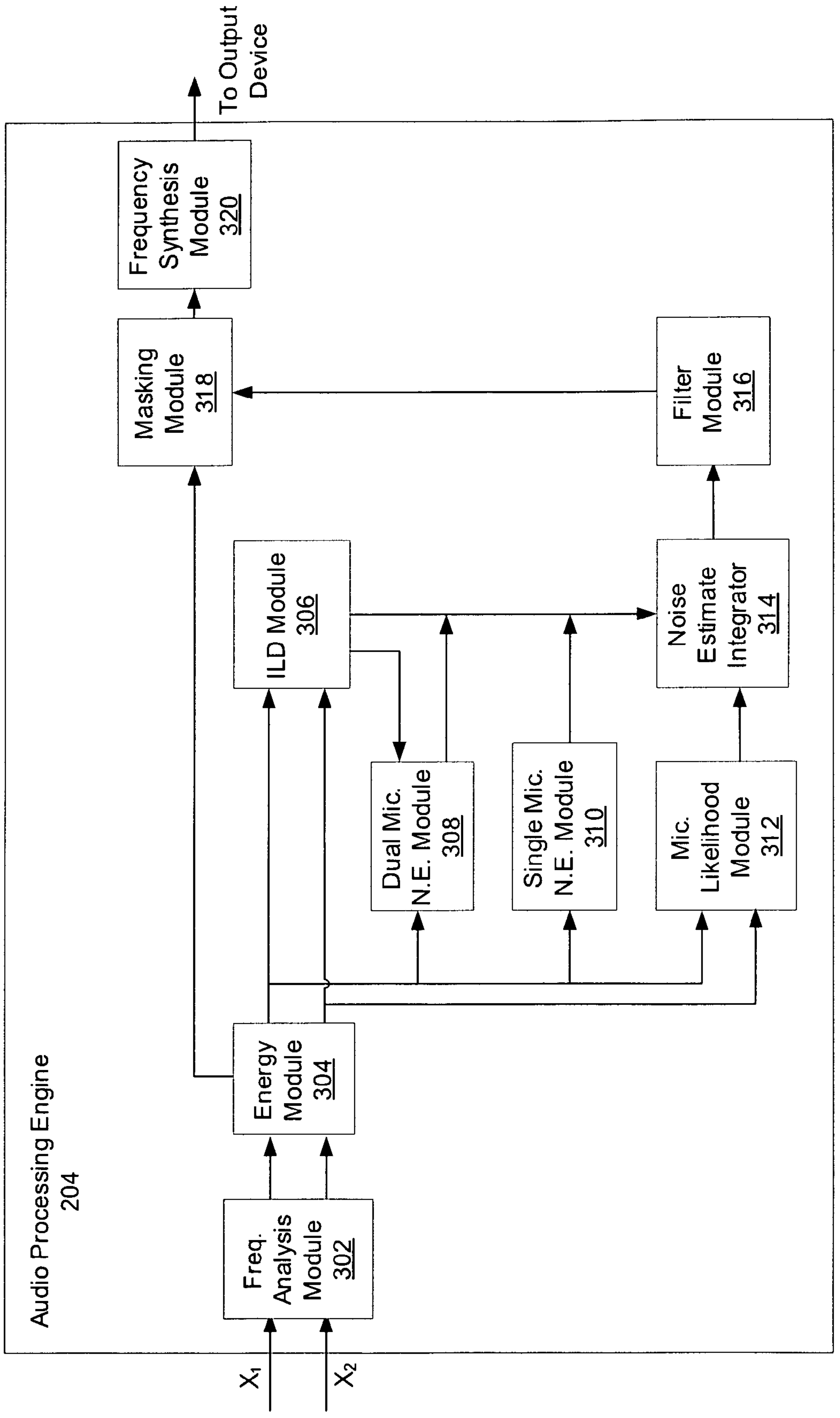
FIG. 3 is a block diagram of an exemplary audio processing engine.

FIG. 3 is a detailed block diagram of the exemplary audio processing engine 204. In exemplary embodiments, the audio processing engine 204 is embodied within a memory device. In operation, the acoustic signals received from the primary and secondary microphones 106 and 108 are converted to electric signals and processed through a frequency analysis module 302. In one embodiment, the frequency analysis module 302 takes the acoustic signals and mimics the frequency analysis of the cochlea (i.e., cochlear domain) simulated by a filter bank. In one example, the frequency analysis module 302 separates the acoustic signals into frequency sub-bands. A sub-band is the result of a filtering operation on an input signal, where the bandwidth of the filter is narrower than the bandwidth of the signal received by the frequency analysis module 302. Alternatively, other filters such as short-time Fourier transform (STFT), sub-band filter banks, modulated complex lapped transforms, cochlear models, wavelets, etc., can be used for the frequency analysis and synthesis. Because most sounds (e.g., acoustic signals) are complex and comprise more than one frequency, a sub-band analysis on the acoustic signal may be useful to determine the power of the signal within certain frequency ranges during a frame (e.g., a predetermined period of time). According to one embodiment, the frame is 5 ms long.

Once the sub-band signals are determined, the sub-band signals are forwarded to an energy module 304 which computes energy/power estimates for the primary and secondary acoustic signals during an interval of time for each frequency sub-band (i.e., power estimates). The exemplary energy module 304 is a component which, in some embodiments, can be represented mathematically by the following equation:

$$E_1(t,\omega)=\lambda_E|X_1(t,\omega)|^2+(1-\lambda_E)E_1(t-1,\omega)$$

where $\lambda_E$ is a number between zero and one that determines the adaptation speed of the power estimate, $X_1(t,\omega)$ is the acoustic signal of the primary microphone 106 in the cochlea domain, ω represents the center frequency of the sub-band, and t is the time frame index. Given a desired time constant T (e.g., 4 ms) and the hop size between frames $T_{hop}$ (e.g., 5 ms), the value of $\lambda_E$ can be approximated as $$\lambda_E = 1 - e^{-\frac{T_{hop}}{T}}$$

The energy level of the acoustic signal received from the secondary microphone 108 may be approximated by a similar exemplary equation $$E_2(t,\omega)=\lambda_E|X_2(t,\omega)|^2+(1-\lambda_E)E_2(t-1,\omega)$$

where $X_2(t,\omega)$ is the acoustic signal of the secondary microphone 108 in the cochlea domain. Similar to the calculation of energy level for the primary microphone 106, energy level for the secondary microphone 108, $E_2(t,\omega)$, is dependent upon the energy level for the secondary microphone 108 in the previous time frame, $E_2(t-1,\omega)$.

Given the calculated energy levels, an inter-microphone level difference (ILD) may be determined by an ILD module 306. Because the primary and secondary microphones 106 and 108 are oriented in a particular way, certain level differences will occur when speech is active and other level differences will occur when noise is active. The ILD module 306 is a component which may be approximated mathematically, in one embodiment, as $$IDL(t,\omega) = \left[1 - 2\frac{E_1(t,\omega)E_2(t,\omega)}{E_1^2(t,\omega)+E_2^2(t,\omega)}\right] * \mathrm{sign}(E_1(t,\omega)-E_2(t,\omega))$$

where $E_1$ is the energy level of the primary microphone 106 and $E_2$ is the energy level of the secondary microphone 108, both of which are obtained from the energy module 304. This equation provides a bounded result between −1 and 1. For example, ILD goes to 1 when the $E_2$ goes to 0, and ILD goes to −1 when $E_1$ goes to 0. Thus, when the speech source is close to the primary microphone 106 and there is no noise, ILD=1, but as more noise is added, the ILD will change. However, as more noise is picked up by both of the microphones 106 and 108, it becomes more difficult to discriminate speech from noise. As such, some embodiments of the present invention are directed to handling this situation. In one example, the ILD may be approximated by $$ILD(t, \omega) = \frac{E_1(t, \omega) - E_2(t, \omega)}{E_1(t, \omega) + E_2(t, \omega)}.$$

Another embodiment of the ILD is $$ILD(t, w) = \min\left(1, \max\left(-1, [\log_2(E_1(t, \omega)) - \log_2(E_2(t, \omega))] \cdot \frac{1}{\Delta}\right)\right),$$

where Δ is a normalization factor.

If the primary and secondary microphones are closely-spaced (e.g., 1-2 cm apart), a pair of simulated directional microphone responses may be generated. In this case, the ILD may be defined as in any of the embodiments above, where $E_1$ is the energy level in the forwards-facing simulated microphone (i.e., facing towards the main speech source), and $E_2$ is the energy level in the backwards-facing simulated microphone (i.e., facing away from the main speech source). For this microphone configuration, the ILD will henceforth refer to the level difference between the simulated microphones, and the raw-ILD refers to the level difference between the primary and secondary microphone signals. For the microphone configuration shown in FIG. 1, both the raw-ILD and ILD refer to the level difference between the primary and secondary microphone signals. The region of high ILD occupied by speech, in either of the microphone configurations, is referred to as the cone.

In exemplary embodiments, the ILD may be used, in part, by the audio processing engine 204 to determine if the noise suppression system should switch from utilizing a dual microphone noise estimate to a single microphone noise estimate to determine a gain mask. As such, the ILD may act as a cue to determine whether the audio processing engine 204 should fallback to a single microphone noise suppression system. Thus, the ILD may be provided to a noise estimate integrator 314 for this determination as will be discussed further below.

According to exemplary embodiments, the dual microphone noise estimate module 308 attempts to estimate a noise component from the primary and secondary microphone signals. In exemplary embodiments, the dual microphone noise estimate is primarily based on the acoustic signal received by the primary microphone 106 and the calculated ILD. The exemplary dual microphone noise estimate module 308 is a component which may be approximated mathematically by $$N(t,\omega)=\lambda_I(t,\omega)E_1(t,\omega)+(1-\lambda_I(t,\omega))\min[N(t-1,\omega),E_1(t,\omega)]$$

according to one embodiment of the present invention. As shown, the noise estimate in this embodiment is based on minimum statistics of a current energy estimate of the primary microphone 106, $E_1(t,\omega)$, and a noise estimate of a previous time frame, $N(t-1,\omega)$. Therefore the noise estimation is performed efficiently and with low latency.

$\lambda_I(t,\omega)$ in the above equation is derived from the ILD approximated by the ILD module 306, as $$\lambda_I(t, \omega) = \begin{cases} \approx 1 & \text{if } ILD(t, \omega) < \text{threshold} \\ \approx 0 & \text{if } ILD(t, \omega) \geq \text{threshold} \end{cases}$$

That is, when the ILD is smaller than a threshold value (e.g., threshold=0.5) above which speech is expected to be, $\lambda_I$ is large, and thus the noise estimator follows the energy estimate of the primary microphone closely. When ILD starts to rise (e.g., because speech is detected), however, $\lambda_I$ decreases. As a result, the dual microphone noise estimate module 308 may slow down the noise estimation process and the speech energy may not contribute significantly to the final noise estimate. Therefore, exemplary embodiments of the present invention may use a combination of minimum statistics and voice activity detection to determine the dual microphone noise estimate.

The exemplary single microphone noise estimate module 310 is configured to determine a single microphone noise estimate based entirely on the primary acoustic signal (e.g., ILD is not utilized). In exemplary embodiments, the single microphone noise estimate module 310 comprises a minimum statistics tracker (MST) which receives the energy from the signal path. In some embodiments, the signal path may be received from an optional preprocessing stage applied to the primary microphone energy. Otherwise, the primary input to the minimum statistics tracker may be the primary microphone energy.

The exemplary MST may track a minimum energy per frequency sub-band across time. If the maximum duration that the minimum energy is held is longer than the typical syllabic duration, then the noise estimate may be relatively unaffected by the speech level. The minimum statistics tracking may be based upon an assumption that a noise level changes at a much slower rate than a speech level. The single microphone noise estimate may be obtained by using the signal path energy, effectively during speech pauses, to extrapolate across regions where speech is present. It should be noted that alternative embodiments may utilize other known methods for determining the single microphone noise estimate.

Since the minimum statistics tracker may not exploit spatial information that is available to multiple microphone systems and since it relies on stationary cues, the minimum statistics tracker may underestimate the noise level for non-stationary distractors since a minimum energy is tracked. As such, an alternative embodiment of a single microphone noise estimator that is not solely based upon minimum statistics may be more appropriate.

In exemplary embodiments, the single microphone noise estimate module 310 is configured to obtain an independent noise energy estimate per frequency sub-band. Initially, a fine smoothing over time of an input frame energy per sub-band may be performed. In exemplary embodiments, minimum tracking is performed within a logarithmic domain. As a result, the initial fine smoothing of the signal path frame energies may be performed to attenuate any large negative peaks (in dB). A sub-band dependent smoothing time constant (T) may be of the order of 20 ms at 1 kHz and may be inversely proportional to sub-band bandwidth. Smoothing may be performed using a leaky integrator, as follows:

$$y[n]=y[n-1]+\lambda\cdot(x[n]-y[n-1]),$$

where $$\lambda=1-e^{-\frac{T_{hop}}{T}},$$

$T_{hop}$ is the hop size between frames, and x[n] and y[n] are the frame energies before and after smoothing, respectively.

In exemplary embodiments, the single microphone noise estimate module will want to avoid performing adaptation on sub-bands identified as speech. An optional component of, or input to, the minimum statistics tracker may be a mask identifying sub-bands in which there is speech energy. In one embodiment, the minimum statistics tracker may slow down or prevent adaptation in sub-bands where speech is identified. This may be termed "speech avoidance."

In exemplary embodiments, a minimum energy may be held for a fixed number of frames or until a new minimum is found.

Many of the adaptation time constants may be sub-band dependent, where, in general, adaptation is slower at lower frequency sub-bands to avoid speech loss. This is in line with a general observation that the higher frequency components of speech phonemes are typically of shorter duration, and thus, noise estimate tracking may be performed at a faster rate at higher-frequencies.

Post-initial smoothing, a minimum energy per sub-band is held in a buffer for a fixed length of time (e.g., in the region of 300 ms for frequencies above ~600 Hz and 1-2 s for frequencies below ~200 Hz, with a cross-fade in-between) or until a new minimum is obtained (e.g., if speech avoidance is active, the minimum may be kept for longer). An output may comprise a sequence of discrete steps in energy. A smoothly time-varying noise estimate may be obtained by passing this output to a leaky integrator utilizing a fast adaptation time constant for decreasing noise level or a slow adaptation time constant for increasing noise level, as follows:

$$\text{if } x[n]>y[n-1],\quad \lambda=1-e^{-\frac{T_{hop}}{T_{slow}}},$$

$$\text{else } \lambda=1-e^{-\frac{T_{hop}}{T_{fast}}}.$$

$$y[n]=y[n-1]+\lambda\cdot(x[n]-y[n-1]),$$

where $T_{slow}/T_{fast}$ is a time constant for increasing/decreasing noise levels.

The adaptation time constant for increasing noise levels may be derived from an estimate of a global signal-to-noise ratio (SNR) (i.e., an average SNR based on SNRs for all frequency sub-bands). At high SNRs, speech preservation may be deemed to be more important than noise suppression since any loss of speech would be clearly audible, whereas inadequate suppression of the noise would be less of a concern since the noise would already be at a low level. By using a slower adaptation time constant (i.e., longer time constant), the noise estimate becomes more invariant to the level of the speech, resulting in less speech attenuation. At lower SNRs, largest net gain in overall quality may be obtained by allowing more noise suppression at the expense of some speech loss. Thus, the adaptation time constant is shortened to allow faster convergence to the quasi-stationary noise level, which has an effect of reducing a number of noise artifacts that typically arise from slowly time-varying noise sources.

In exemplary embodiments, the adaptation time constant for increasing noise levels may be changed based on a global estimate of the SNR. The SNR (globally over all sub-bands) may be estimated as a ratio of a global speech level to a global noise level, which may be tracked independently using two leaky integrators. The leaky integrator used to obtain the global speech level has a fast/slow time constant for increasing/decreasing levels resulting in the speech level tracking peaks of the input signal energy, $x_{signal}[n]$, per frame:

$$\text{if } x[n]>y[n-1],\quad \lambda=1-e^{-\frac{T_{hop}}{T_{fast}}},$$

$$\text{else } \lambda=1-e^{-\frac{T_{hop}}{T_{slow}}}$$

$$y[n]=y[n-1]+\lambda\cdot(x_{signal}[n]-y[n-1]),$$

where $T_{slow}/T_{fast}$ is the time constant for decreasing/increasing input signal energy, $T_{slow}$ is around 20 s, and $x_{signal}[n]$ is obtained by summing over sub-bands in the linear domain the per sub-band energies.

The noise energy within a frame, $x_{noise}[n]$, is obtained by summing over sub-bands the minimum energy within the buffer. This is input to the leaky integrator that provides the global noise level, which has a slow/fast time constant for increasing/decreasing levels:

$$\text{if } x[n]>y[n-1],\quad \lambda=1-e^{-\frac{T_{hop}}{T_{slow}}},$$

$$\text{else } \lambda=1-e^{-\frac{T_{hop}}{T_{fast}}}$$

$$y[n]=y[n-1]+\lambda\cdot(x_{noise}[n]-y[n-1]),$$

where $T_{slow}/T_{fast}$ is the time constant for increasing/decreasing noise levels, and $T_{slow}$ is generally chosen to be slower than the minimum search length.

In exemplary embodiments, there are two thresholds associated with the global SNR. If the SNR is above a maximum limit (e.g., around 45 dB), the slower adaptation time constant for increasing noise levels is used. If the SNR is below a lower limit (e.g., around 30 dB), the faster adaptation time constant is used. Finally, if the SNR is intermediate, an interpolation, or any other value, between the two adaptation time constants may be utilized.

Finally, a compensation bias may be added to the minimum energy to obtain an estimate of an average noise level. A component of the minimum statistics tracker may apply a sub-band dependent gain to the minimum noise estimate. This gain may be applied to compensate for the minimum noise estimate being a few dB below an average noise level. As a function of the sub-band number and for a particular set of time constants, this gain may be referred to as a "MST bias compensation curve." In some embodiments, the MST bias compensation curve may be determined analytically. In other embodiments, it may be impractical to attempt to find an analytical solution. In these embodiments, two bias compensation curves (e.g., one each for high and low SNRs) may be derived empirically using a calibration procedure. Then, an actual bias compensation curve may comprise an interpolation between these two bias compensation curves based upon the global SNR estimate. A test input signal for calibration may be a stationary synthetic pink noise signal with intermittent bursts of higher-level pink noise or speech to simulate a particular SNR. The bias compensation curve may be a ratio of a known energy of the stationary pink noise component to the estimated stationary noise energy. In some embodiments, the bias may vary from 4 dB to 8 dB.

The microphone likelihood module 312 is configured to determine a secondary microphone confidence (SMC). The SMC may be used, in part, to determine if the noise suppression system should revert to using the single microphone noise estimate if the secondary-microphone signal (and hence the ILD cue) is deemed to be unreliable. Thus in some embodiments, the microphone likelihood module 312 is a secondary microphone failure or blockage detector.

The likelihood module 312 may utilize two cues to determine the SMC: the secondary microphone sub-band frame energies and the raw-ILD. A lower energy threshold applied to the sum of the secondary microphone sub-band energies in a frame may be used to detect whether the secondary microphone is malfunctioning (e.g., the signal produced by the secondary microphone is close to zero or direct current (DC)). However, in some embodiments, this threshold, alone, may not be a reliable indicator of microphone blockage because blockage by a physical object tends to attenuate and modify the spectral shape of the signal produced by the microphone but not eliminate the signal entirely. Some sub-bands may be completely attenuated while other sub-bands are marginally affected. Thus, a consistently high raw-ILD in a particular sub-band may be a more robust indicator of secondary microphone blockage. The presence of a consistently high raw-ILD in a sub-band may be detected by averaging or smoothing the raw-ILD per sub-band over a time scale longer than the typical syllabic duration (e.g., 0.5 seconds). If the resulting averaged or smoothed raw-ILD is close to unity, it may be assumed that the secondary microphone sub-band signal is severely affected by blockage, and the ILD within this sub-band may not provide useful information. As a result, the SMC may have a value close to zero (0) if the raw-ILD is consistently high or the energy threshold is not exceeded. In contrast, a SMC value close to one (1) may indicate that the secondary microphone is reliable and information from the secondary microphone may be utilized.

In exemplary embodiments, while it is possible for different sub-bands to have different confidence measures, in the event that a vast majority of sub-bands have zero confidence, then the confidence of all frequency sub-bands may be set to zero (0).

In some embodiments, the secondary microphone may be positioned on a backside of a handset. As such, the secondary microphone may come easily obstructed by a hand of a user, for example. The SMC comprises an estimate of the likelihood that the ILD is a reliable cue for distinguishing between speech and distractor(s). During blockage or malfunction of the secondary microphone, the ILD is heavily distorted, and may not have sufficient resolution to distinguish between speech and distractor(s), even when they arise from different spatial locations. In embodiments where the SMC is low (e.g., secondary microphone is blocked or fails), noise suppression may continue with a lower performance objective. The microphone likelihood module 312 will be discussed in more details in connection with FIG. 4 below.

In exemplary embodiments, the ILD, single and dual microphone noise estimates, and the SMC are then forwarded to a noise estimate integrator 314 for processing. In exemplary embodiments, the noise estimate integrator 314 is configured to combine the single and dual microphone noise estimates (e.g., determine if fallback from a dual microphone noise suppression system to a single microphone noise suppression system is necessary). The noise estimate integrator 314 will be discussed in more details in connection with FIG. 4 below.

A filter module 316 then derives a gain mask based on the combined noise estimate. In one embodiment, the filter is a Wiener filter. Alternative embodiments may contemplate other filters. A detailed discussion with respect to generating a gain mask using a Wiener filter is provided in U.S. patent application Ser. No. 11/343,524, entitled "System and Method for Utilizing Inter-Microphone Level Differences for Speech Enhancement," which is incorporated by reference. In an alterative embodiment, the filter module 316 may utilize an adaptive intelligent suppression (AIS) generator as discussed in U.S. patent application Ser. No. 11/825,563, entitled "System and Method for Adaptive Intelligent Noise Suppression," which is also incorporated by reference.

The gain mask generated by the filter module 316 may then be applied to the signal path in a masking module 318. The signal path may be the primary acoustic signal, or a signal derived from the primary acoustic signal through a pre-processing stage. In exemplary embodiments, the gain mask may maximize noise suppression while minimizing speech distortion. The resulting noise suppressed signal comprises a speech estimate.

Next, the speech estimate is converted back into the time domain from the cochlea domain. The conversion may comprise taking the speech estimate and adding together phase and temporally shifted signals of the cochlea sub-bands in a frequency synthesis module 320. Once conversion is completed, the signal may be output to the user. Those skilled in the art will appreciate that there are many methods of which the speech estimate may be converted back into the time domain.

It should be noted that the system architecture of the audio processing engine 204 of FIG. 3 is exemplary. Alternative embodiments, for example that of FIG. 7, may comprise more components, less components, or equivalent components and still be within the scope of embodiments of the present invention. Various modules of the audio processing engine 204 may be combined into a single module. For example, the functionalities of the frequency analysis module 302 and energy module 304 may be combined into a single module. As a further example, the functions of the ILD module 306 may be combined with the functions of the energy module 304 alone, or in combination with the frequency analysis module 302.

Although ILD cues are discussed regarding FIG. 3, those skilled in the art will appreciate that many different cues may be used and still fall within the scope of the various embodiments. In some embodiments, a cue other than the ILD, but derived from the primary and the secondary acoustic signals, could be used as a mechanism to trigger single microphone noise suppression fallback. In one example, an interaural time difference (ITD), or cross correlation of the two signals is used as the detection mechanism to trigger the single microphone noise suppression fallback.

Figure 4:
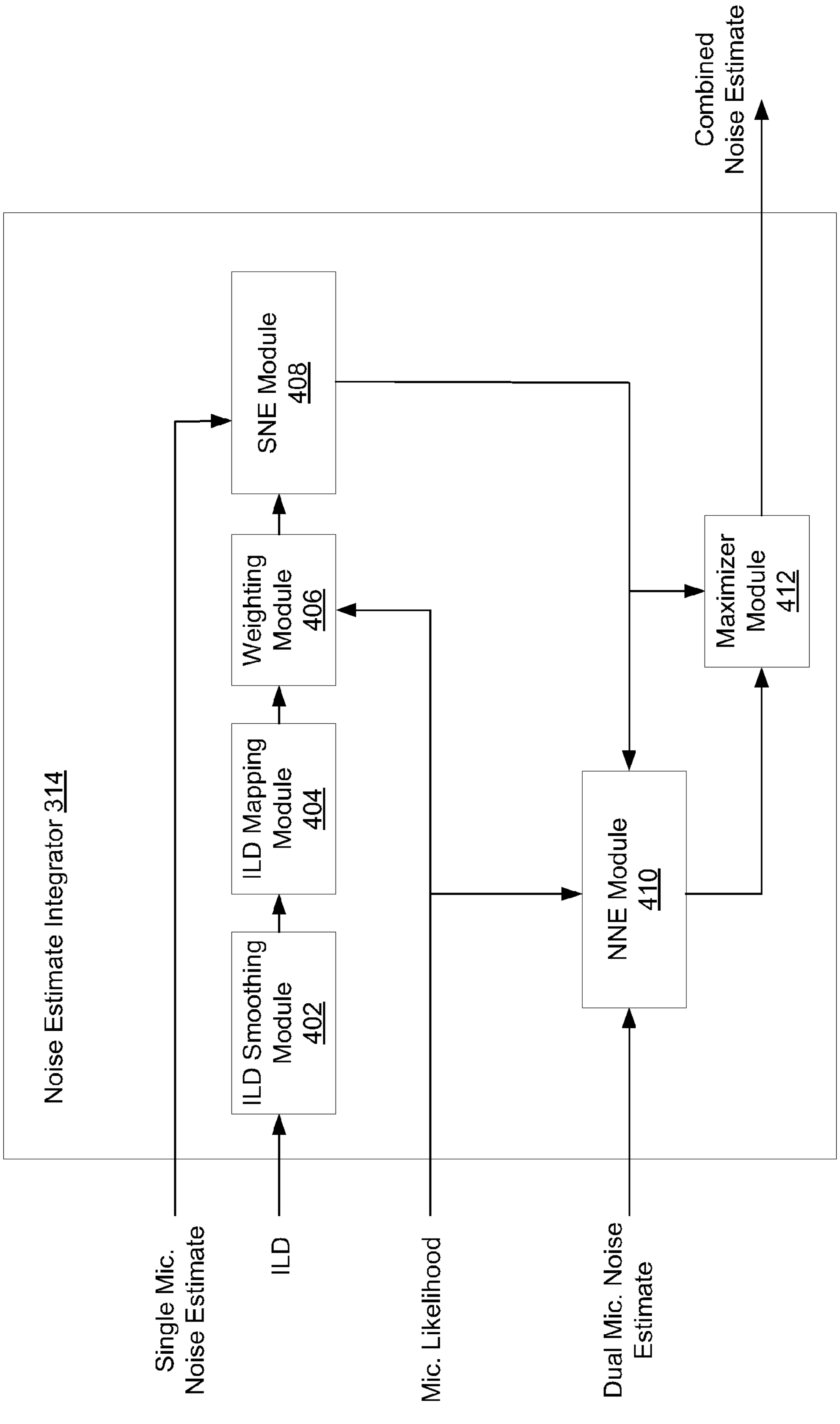
FIG. 4 is a block diagram of an exemplary noise estimate integrator.

Referring now to FIG. 4, the exemplary noise estimate integrator 314 is shown in more detail. In exemplary embodiments, the noise estimate integrator 314 integrates the single microphone noise estimate (e.g., MST output) and the ILD-based dual microphone noise estimate into a combined noise estimate (CNE). In exemplary embodiments, the noise estimate integrator 314 comprises an ILD smoothing module 402, an ILD mapping module 404, a weighting module 406, a stationary noise estimate module 408, a non-stationary noise estimate module 410, and a maximizer module 412.

In accordance with exemplary embodiments, there are two main circumstances in which the ILD-based dual microphone noise estimate may become less accurate resulting in a preference to utilize the single microphone noise estimate. The first situation is when the SMC is low. The second situation occurs when a distractor with a stationary component has a high ILD in an expected speech range. In this second case, background noise may be mistaken as speech, which may result in noise leakage. The single microphone noise estimate may be useful to avoid noise leakage and musical noise artifacts, by providing a noise floor for the CNE. Thus, the exemplary noise estimate integrator 314 uses the maximizer module 412 to combine the outputs of the stationary noise estimate module 408 and the non-stationary noise estimate module 410.

The ILD may be utilized in exemplary embodiments to determine weighting of the single and dual microphone noise estimates. The ILD smoothing module 402 is configured to temporarily smooth the ILD. The smoothing may be performed with a time constant longer than the typical syllabic duration to detect if there is a stationary distractor within the cone. For example, if only clean speech (i.e., no distractors) is present, ILD may fluctuate between a high value (e.g., 1 for speech) and low value (e.g., 0 for pauses between speech). Thus the smoothed ILD would be between 0 and 1. However, a stationary distractor within the cone will have a consistently high ILD, and so a smoothed ILD that is closer to 1 may result. Thus, it may be possible to distinguish between speech and a stationary distractor, both of high ILD, by temporally smoothing the ILD per frequency sub-band.

In one embodiment, the ILD smoothing module 402 comprises a leaky integrator which smoothes the ILD per sub-band. Those skilled in the art will appreciate that there are many ways to smooth the ILD per sub-band.

After smoothing the ILD over time, the ILD is processed by the ILD mapping module 404. In exemplary embodiments, the ILD mapping module 404 may comprise a piecewise-linear ILD mapping function, as follows:

$$p(ILD) = \begin{cases} 1; & ILD \le ILD_{min} \\ 1 - (ILD - ILD_{min})/(ILD_{max} - ILD_{min}); & ILD_{min} < ILD < ILD_{max}, \\ 0; & ILD \ge ILD_{max} \end{cases}$$

where $ILD_{max}$ is an estimate of the lower edge of the ILD range in the cone, and $(ILD_{max}-ILD_{min})$ is a fading region on an edge of the cone. The ILD mapping module 404 maps the smoothed ILD onto a confidence range (e.g., between 0 and 1). An output of zero (0) may occur when the smoothed ILD is within the cone (e.g., above 0.4), and an output of one (1) occurs when the smoothed ILD is outside of the cone (e.g., less than 0.2). In some embodiments, time constants for smoothing the ILD may be sufficiently long (e.g., around 1 second) such that for normal clean speech, the ILD may be rarely pushed above $ILD_{max}$.

The weighting module 406 determines a weight factor w which may be close to zero (0) if the secondary microphone fails or a consistently high ILD is present for a long period of time (i.e., the output of the ILD mapping module 404 is close to zero (0)). In one embodiment, the weighting module may be calculated as follows:

$$w=\min\{p(\mathrm{ILD}), \mathrm{SMC}\}$$

The weighting factor w has a value between zero (0) and one (1).

The stationary noise estimate module 408 may perform a cross-fade between the single microphone noise estimate (i.e., SMNE) and a single microphone noise estimate offset by a constant positive gain of, for example, 2 dB to 3 dB (i.e., SMNE+), using a weighting factor w computed by the weighting module 406, as follows:

$$\mathrm{SNE}=\mathrm{SMNE}^{+}\cdot(1-w)+\mathrm{SMNE}\cdot w,$$

where SNE is a stationary noise estimate. In exemplary embodiments, when the weighting factor w is zero (0), the stationary noise estimate is a few dB higher than the single microphone noise estimate. This may result in a slightly more aggressive stationary noise estimate, resulting in less noise leakage, when the dual microphone noise estimate may be inaccurate due to unreliable spatial cues or insufficient spatial resolution to distinguish speech from distractor(s), i.e. inside the cone, and so the single microphone noise estimate may be relied on more heavily. When the weighting factor w is one (1), the stationary noise estimate is the same as the single microphone noise estimate. Thus, a more conservative stationary noise estimate is used outside of the cone to avoid unnecessary speech attenuation. The stationary noise estimate may be used to provide a floor for the overall CNE, which may provide some assistance in stationary noise suppression, with a minimum of speech distortion. In some embodiments, a weighting factor w in-between 0 and 1 may result in application of a proportional gain. It should be noted that the weighting factor w determined by the weighting module 406 may be different and independent for each frequency sub-band.

Using a similar cross-fade mechanism, a non-stationary noise estimate may be derived from the stationary noise estimate output from the stationary noise estimate module 408 and the dual microphone noise estimate (DNE), as follows:

$$\mathrm{NNE}=\mathrm{SNE}\cdot(1-\mathrm{SMC})+\mathrm{DNE}\cdot\mathrm{SMC}.$$

As shown, the SMC is also utilized in determining the NNE. Thus, when the SMC is low (e.g., zero), the dual microphone noise estimate becomes unreliable. In these embodiments, the noise suppression system may disregard the dual microphone noise estimate and revert to utilizing the stationary noise estimate. Thus, the non-stationary noise estimate module 410 may, effectively, substitute the stationary noise estimate for the non-stationary noise estimate.

Finally, a combined noise estimate (CNE) is determined by the maximizer module 412. In exemplary embodiments, the maximizer module 412 may be approximated by:

$$\mathrm{CNE}=\max(\mathrm{SNE}, \mathrm{NNE}).$$

Thus, in accordance with exemplary embodiments, the CNE is effectively a maximum of the stationary noise estimate (SNE) and the non-stationary noise estimate (NNE) in each frequency sub-band. Alternative embodiments, may contemplate utilizing other functions for combining the noise estimates.

Figure 5:
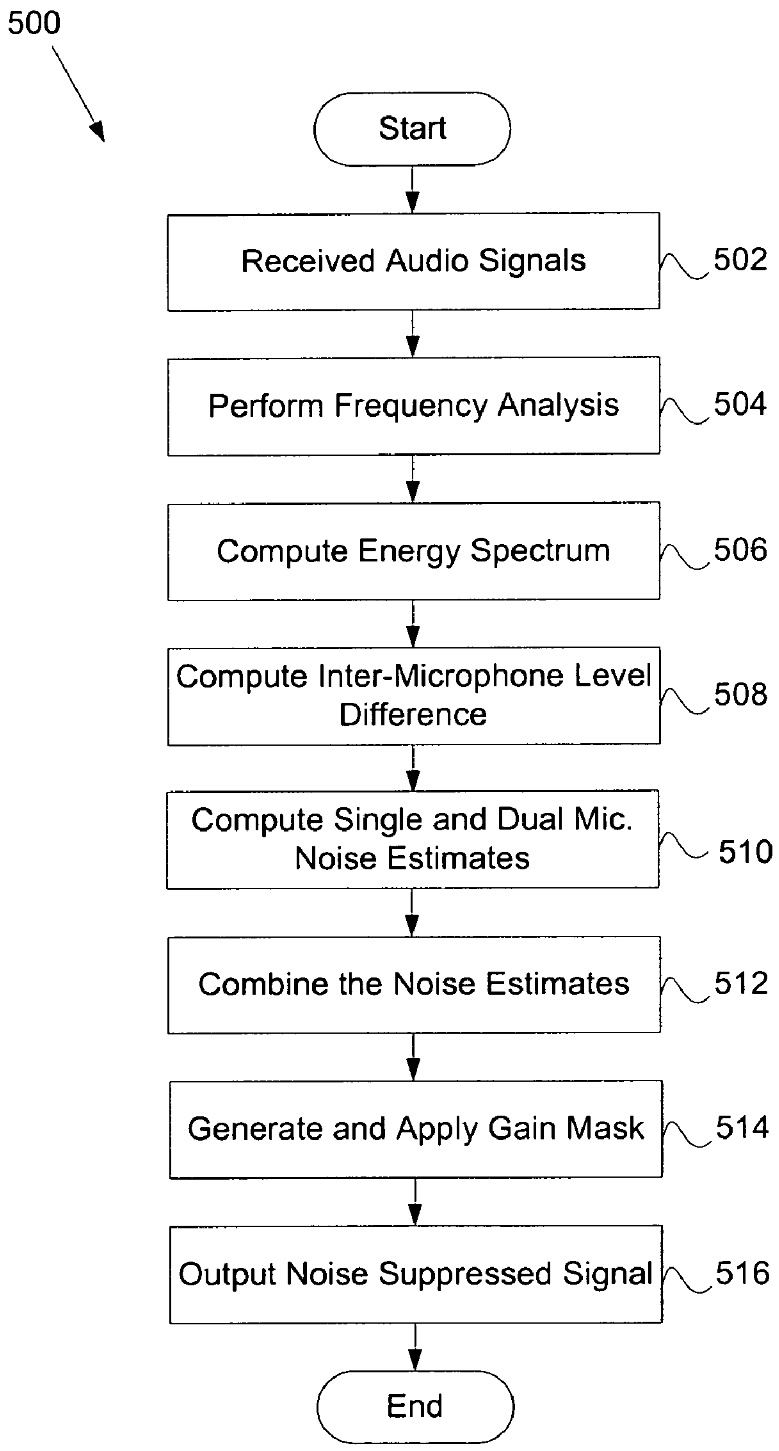
FIG. 5 is a flowchart of an exemplary method for providing single microphone noise suppression fallback.

Referring now to FIG. 5, an exemplary flowchart 500 of an exemplary method for noise suppression providing single microphone noise suppression fallback is shown. In step 502, acoustic signals are received by the primary and secondary microphones 106 and 108, respectively. In exemplary embodiments, the acoustic signals are converted to digital format for processing.

Frequency analysis is then performed on the acoustic signals by the frequency analysis module 302 in step 504. According to one embodiment, the frequency analysis module 302 utilizes a filter bank to split the acoustic signal(s) into individual frequency sub-bands. If the primary and secondary microphones are closely-spaced (e.g., 1-2 cm), this may be followed by an optional step which determines the sub-band components of two simulated directional microphone responses, which may be used in addition to the primary and secondary microphone sub-band signals in step 508.

In step 506, energy spectra for the received acoustic signals by the primary and secondary microphones 106 and 108, and if applicable, the energies of the two simulated directional microphones are computed. In one embodiment, the energy estimate of each frequency sub-band is determined by the energy module 304. In exemplary embodiments, the exemplary energy module 304 utilizes a present acoustic signal and a previously calculated energy estimate to determine the present energy estimate.

Once the energy estimates are calculated, inter-microphone level differences (ILD) are computed in optional step 508. In one embodiment, the ILD or raw-ILD is calculated based on the energy estimates (i.e., the energy spectrum) of both the primary and secondary acoustic signals. In another embodiment in which the primary and secondary microphones are closely spaced, the ILD is calculated based on the energy estimates of the two simulated directional microphones, and the raw-ILD is based on the energy estimates of both the primary and secondary acoustic signals. In exemplary embodiments, the ILD is computed by the ILD module 306.

Subsequently, the single and dual noise estimates are determined in step 510. According to embodiments of the present invention, the single microphone noise estimate for each frequency sub-band is based on the acoustic signal received at the primary microphone 106. In contrast, the dual microphone noise estimate for each frequency sub-band is based on the acoustic signal received at the primary microphone 106 and the ILD. Since the ILD is calculated using the acoustic signals from both the primary and secondary microphones 106 and 108, this noise estimate is a dual microphone noise estimate.

In step 512, the single and dual microphone noise estimates are combined. Step 512 will be discussed in more detail in connection with FIG. 6.

In step 514, a gain mask is computed by the filter module 316. Once computed, the gain mask may be applied to the primary acoustic signal to generate a noise suppressed signal. Subsequently, the noise suppressed signal is output in step 516. In exemplary embodiments, the noise suppressed signal may be converted back to the time domain for output. Exemplary conversion techniques apply an inverse transform to the cochlea sub-band signals to obtain a time-domain speech estimate.

Figure 6:
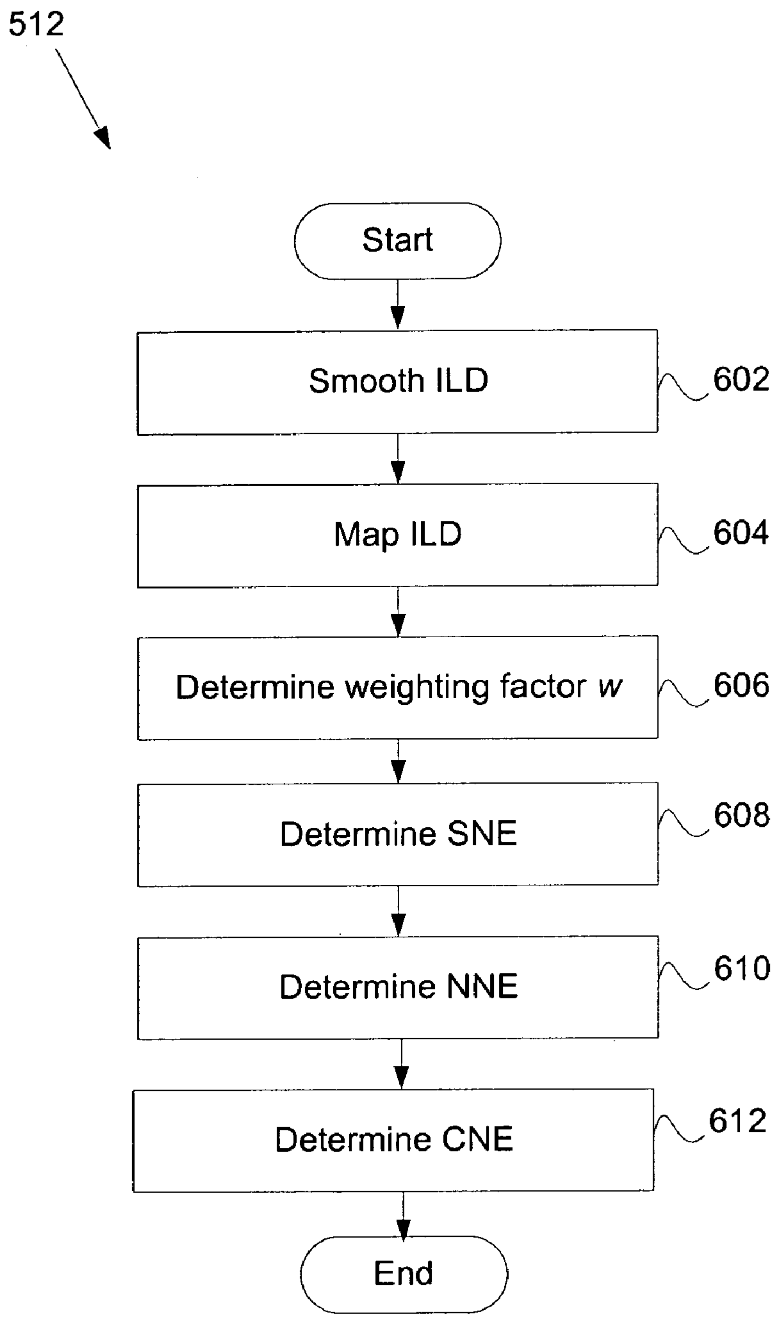
FIG. 6 is a flowchart of an exemplary method for determining a combined noise estimate.

FIG. 6 is a flowchart of an exemplary method for determining a combined noise estimate (step 512). In step 602, the ILD per frequency sub-band is smoothed. In exemplary embodiments, the ILD is temporally smoothed with a time constant longer than the typical syllabic duration to detect for any stationary distractors within the cone. The smoothing may be performed using a leaky integrator in accordance with one embodiment.

After smoothing, the ILD is mapped in step 604. In one embodiment, the mapping may comprise piecewise-linear ILD mapping which maps the smoothed ILDs onto a confidence range. This confidence range may span between 0 and 1.

A weighting factor is then determined instep 606. This weight factor may be applied to the single microphone noise estimate in order to determine a final stationary noise estimate. In exemplary embodiments, weighting factor may be close to 0 if the secondary microphone confidence is low or if the output of the ILD mapping module 404 is low.

A stationary noise estimate (SNE) is determined in step 608. In accordance with exemplary embodiments, the SNE is based on the application of the weight to the single microphone noise estimate.

In step 610, the non-stationary noise estimate (NNE) is determined. In exemplary embodiments, the NNE may be based on the SNE, SMC, and the dual microphone noise estimate.

It will be appreciated by those skilled in the art that the NNE may not solely consist of non-stationary noise and the SNE may not solely consist of stationary noise. As the terms refer, the SNE and the NNE are estimates, and each may comprise varying amounts of stationary noise, non-stationary noise, and/or speech.

In step 612, a combined noise estimate (CNE) is determined. In exemplary embodiments, the CNE is based on a combination of the SNE and the NNE. In one embodiment, the combination comprises a maximization between the SNE and NNE per frequency sub-band. Alternative embodiments may utilize other combination schemes.

It should be noted that the method of FIG. 6 is exemplary. Alternative embodiments may contemplate more, less, or functionally equivalent steps or steps performed in a different order. For example, the NNE may be determined (step 610) prior to the determination of the SNE (step 608). It should also be noted that the computations and determinations made herein are performed per frequency sub-band.

Figure 7:
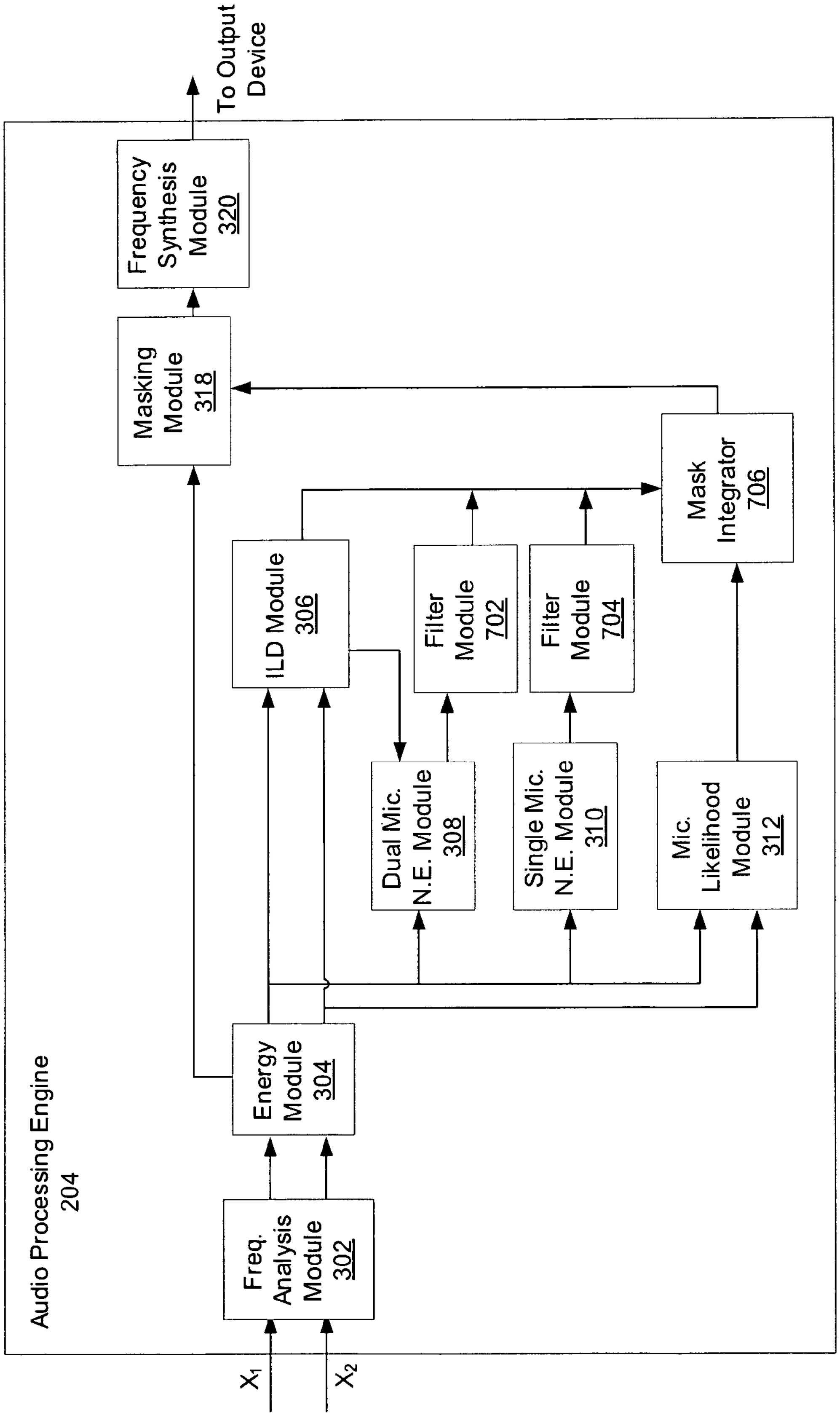
FIG. 7 is a black diagram of another exemplary audio processing engine.

FIG. 7 is a block diagram of another exemplary audio processing engine 204. Similar to FIG. 3 in operation, the acoustic signals received from the primary and secondary microphones 106 and 108 are converted to electric signals and processed through a frequency analysis module 302. Once the sub-band signals are determined, the sub-band signals are forwarded to an energy module 304 which computes energy/power estimates for the primary and secondary acoustic signals during an interval of time for each frequency sub-band (i.e., power estimates). Given the calculated energy levels, an inter-microphone level difference (ILD) may be determined by an ILD module 306. A secondary microphone confidence (SMC) may be determined by the microphone likelihood module 312 based upon the secondary microphone energy estimate and the raw-ILD. According to various embodiments, the dual microphone noise estimate module 308 generates a dual microphone noise estimate and the single microphone noise estimate module 310 generates a single microphone noise estimate. The two noise estimates are filtered by filter module 702 and filter module 704, respectively, and converted into a single microphone gain mask and a dual microphone gain mask, respectively. The two gain masks may then be integrated based on the ILD and the SMC within a mask integrator 706. The masking module 318 may receive the integrated gain mask and apply it to the signal path as discussed with regard to FIG. 3.

The above-described modules can be comprised of instructions that are stored on storage media. The instructions can be retrieved and executed by the processor 202. Some examples of instructions include software, program code, and firmware. Some examples of storage media comprise memory devices (e.g., hard drives, CDs, and DVDs) and integrated circuits. The instructions are operational when executed by the processor 202 to direct the processor 202 to operate in accordance with embodiments of the present invention. Those skilled in the art are familiar with instructions, processor(s), and storage media.

The present invention is described above with reference to exemplary embodiments. It will be apparent to those skilled in the art that various modifications may be made and other embodiments can be used without departing from the broader scope of the present invention. Therefore, these and other variations upon the exemplary embodiments are intended to be covered by the present invention.

The invention claimed is:

1. A method for providing single microphone noise suppression fallback, comprising:
   receiving primary and secondary acoustic signals;
   generating a single microphone noise estimate based on the primary acoustic signal;
   generating a dual microphone noise estimate based on the primary and secondary acoustic signals;
   determining a combined noise estimate based on the single and dual microphone noise estimates;
   generating a gain mask based on the combined noise estimate;
   applying the gain mask to the primary acoustic signal to generate a noise suppressed signal; and
   outputting the noise suppressed signal.

2. The method of claim 1 wherein generating the single noise estimate comprises utilizing minimum statistics tracking.

3. The method of claim 1 wherein determining the combined noise estimate comprises determining a stationary noise estimate.

4. The method of claim 1 wherein determining the combined noise estimate comprises determining a non-stationary noise estimate.

5. The method of claim 1 wherein determining the combined noise estimate comprises selecting a maximum value between stationary and non-stationary noise estimates.

6. The method of claim 1 further comprising determining an inter-microphone level difference between the primary acoustic signal and a secondary acoustic signal.

7. The method of claim 6 wherein generating the dual microphone noise estimate comprises utilizing the inter-microphone level difference.

8. The method of claim 6 further comprising smoothing and mapping the inter-microphone level difference.

9. The method of claim 1 further comprising utilizing a secondary microphone likelihood indicator to determine a weighting factor to apply to the single microphone noise estimate.

10. A system providing one-microphone noise suppression fallback, comprising:
   acoustic sensors configured to receive a primary and a secondary acoustic signal;
   a single microphone noise estimate module configured to generate a single microphone noise estimate based on the primary acoustic signals;
   a dual microphone noise estimate module configured to generate a dual microphone noise estimate based on the primary and secondary acoustic signals;
   a noise estimate integrator configured to determine a combined noise estimate based on the single and dual microphone noise estimates;
   a filter module configured to generate a gain mask based on the combined noise estimate; and
   a masking module configured to apply the gain mask to the primary acoustic signal to generate a noise suppressed signal.

11. The system of claim 10 further comprising an inter-microphone level difference module configured to generate an inter-microphone level difference based on the primary and secondary acoustic signals.

12. The system of claim 10 wherein the noise estimate integrator comprises a weighting module configured to determine a weighting factor to apply to the single microphone noise estimate.

13. The system of claim 10 wherein the noise estimate integrator further comprises a stationary noise estimate module configured to determine a stationary noise estimate based on the single microphone noise estimate.

14. The system of claim 10 wherein the noise estimate integrator further comprises a non-stationary noise estimate module configured to determine a non-stationary noise estimate based on the dual microphone noise estimate.

15. The system of claim 10 wherein the noise estimate integrator comprises a maximizer module configured to determine the combined noise estimate based on a maximum value between stationary and non-stationary microphone noise estimates.

16. The system of claim 10 further comprising a microphone likelihood module configured to detected reliability of the secondary microphone.

17. The system of claim 10 wherein the single microphone noise estimate module comprises a minimum statistics tracker.

18. A machine readable medium having embodied thereon a program, the program providing instructions for a method for providing one-microphone noise suppression fallback, the method comprising:
   receiving primary and secondary acoustic signals;
   generating a single microphone noise estimate based on the primary acoustic signal;
   generating a dual microphone noise estimate based on the primary and secondary acoustic signals;
   determining a combined noise estimate based on the single and dual microphone noise estimates;
   generating a gain mask based on the combined noise estimate;
   applying the gain mask to the primary acoustic signal to generate a noise suppressed signal; and
   outputting the noise suppressed signal.

19. The machine readable medium of claim 18 wherein determining the combined noise estimate comprises determining a stationary noise estimate and non-stationary noise estimate.

20. The machine readable medium of claim 19 wherein determining the combined noise estimate comprises selecting a maximum value between the stationary and non-stationary noise estimates.

21. A machine readable medium having embodied thereon a program, for providing instructions for a method for single microphone noise suppression fallback, the method comprising:
   receiving primary and secondary acoustic signals;
   generating a single microphone speech or noise estimate based on either the primary or the secondary acoustic signal;
   generating a dual microphone speech or noise estimate based on both the primary acoustic signal and the secondary acoustic signal;
   determining a combined speech estimate or a combined noise estimate based on the single and dual microphone speech or noise estimates;
   filtering either the primary or secondary acoustic signal using the combined speech estimate or the combined noise estimate to obtain a noise suppressed signal; and
   outputting the noise suppressed signal.

* * * * *